(12) United States Patent
Brooks et al.

(10) Patent No.: US 6,446,875 B1
(45) Date of Patent: Sep. 10, 2002

(54) WATER TEMPERATURE AND PRESSURE CONTROL SYSTEM

(76) Inventors: Darrell G. Brooks, 1140 Beaver Creek School Rd., West Jefferson, NC (US) 28694; Danny O. Brooks, 1536 Elliott Rd., West Jefferson, NC (US) 28694

( * ) Notice: Subject to any disclaimer, the term of this patent is extended or adjusted under 35 U.S.C. 154(b) by 0 days.

(21) Appl. No.: 09/813,344

(22) Filed: Mar. 20, 2001

(51) Int. Cl.[7] ............................. E03C 1/04; G05D 23/12
(52) U.S. Cl. ......................... 236/12.12; 4/676; 700/239
(58) Field of Search ........................... 236/12.12, 12.11, 236/12.15; 700/239; 4/676

(56) References Cited

U.S. PATENT DOCUMENTS

| | | | | |
|---|---|---|---|---|
| 4,945,943 A | * | 8/1990 | Cogger | 236/12.12 |
| 5,979,776 A | * | 11/1999 | Williams | 236/12.12 |

* cited by examiner

*Primary Examiner*—William Wayner
(74) *Attorney, Agent, or Firm*—Dale J. Ream

(57) ABSTRACT

A water temperature and pressure regulating system includes a control unit having a display module with user controls for selecting from predetermined water temperature and pressure settings and for adjusting those settings. The system includes inlet conduits connected to hot and cold water sources and an outlet conduit. Temperature and pressure sensors are connected to the outlet conduit and communicate with a central processing unit. Each inlet conduit includes a control valve. Electromechanical worm gear assemblies connect the CPU with the control valves for incrementally opening or closing the valves to maintain selected temperature and pressure settings. Temperature sensors connected to the inlet conduits enable the CPU to decrease pressure and conserve hot water while maintaining a selected temperature when cooling of the hot water is detected. The inlet conduit sensors also enable the CPU to open the valves even prior to receiving data from the outlet conduit sensor.

13 Claims, 4 Drawing Sheets

WATER TEMPERATURE AND PRESSURE CONTROL SYSTEM

BACKGROUND OF THE INVENTION

This invention relates generally to mixing valve systems for mixing fluids together and, more particularly, to a system for mixing hot and cold water to selectable temperature and pressure settings and which allows for manual adjustment of those settings during operation.

Setting the flow of water from a faucet or shower to a desired temperature and pressure is an inconvenient process that often requires repeated trial and error movements of a knob or lever. Finding just the right setting is also difficult in that different temperatures or pressures are desired for different applications, e.g. soaking dishes, cleaning dishes, rinsing dishes, showering, etc.

Various devices, valves, or systems have been proposed in the prior art for mixing fluids together. Although assumably for their intended purposes, existing systems do not provide for selecting a desired water temperature and pressure from a set of predetermined settings and being able to adjust these settings during operation. Existing devices also do not provide for conserving hot water which is in short supply by automatically decreasing water pressure in order to maintain a selected water temperature.

Therefore, it is desirable to have a system for regulating water temperature and pressure which allows a user to select from a set of predefined temperature and pressure settings. Further, it is desirable to have a system which automatically decreases pressure when a shortage of hot water is detected so as to maintain the desired temperature for as long as possible.

SUMMARY OF THE INVENTION

A water temperature and pressure regulating system according to the present invention includes a box-shaped control unit having a central processing unit (CPU) mounted therein and having a display module on one side. The display module includes a plurality of user controls thereon, such as selector buttons. The CPU includes a memory for storing a predetermined set of temperature and pressure settings that may be selected by a user using appropriate user controls. The system further includes first and second inlet conduits connected to traditional sources of hot and cold water, respectively. Each inlet conduit includes a control valve for regulating the amount of water allowed to flow through a respective conduit. Each inlet conduit further includes a temperature sensor connected thereto upstream of a respective control valve, the sensors being electrically connected to the CPU. An outlet conduit is coupled to the first and second conduits and defines an outlet through which the mixture of water from the inlet conduits may flow.

A pair of worm gear assemblies provide an electromechanical connection between the CPU and the control valves. Each worm gear assembly includes a motor positioned in the control unit that is electrically connected to the CPU. A shaft coupled to the motor includes threads at one end that mate with the teeth of a worm gear. An operation of the motor causes the shaft and worm gear to rotate which, in turn, actuates a corresponding control valve. Therefore, appropriate CPU signals to the motors operate to open or close the control valves which affects the temperature and pressure of water flowing through the outlet conduit.

The temperature sensor connected to the first inlet conduit communicates with the CPU for detecting the temperature of water flowing therethrough. If a decrease in temperature is detected, the CPU energizes the motors to partially close the control valves so as to conserve an apparent short supply of hot water. This decreases water pressure but maintains a selected water temperature as long as possible. This scenario accounts for a situation of high water consumption which may be emptying a hot water tank.

Therefore, a general object of this invention is to provide a system for regulating the temperature and pressure of a water stream.

Another object of this invention is to provide a system, as aforesaid, which includes user controls and a central processing unit for user selection of predefined water temperature and pressure settings.

Still another object of this invention is to provide a system, as aforesaid, in which control valves connected to inlet conduits are electromechanically actuated by signals from a CPU.

Yet another object of this invention is to provide a system, as aforesaid, having temperature sensors connected to inlet and outlet conduits.

A further object of this invention is to provide a system, as aforesaid, which decreases a selected pressure when hot water is in short supply so as to maintain a selected temperature as long as possible.

A still further object of this invention is to provide a system, as aforesaid, which allows incremental adjustment of water temperature and pressure by a user even after selection of a predefined temperature and pressure setting.

Another object of this invention is to provide a system, as aforesaid, which allows total manual control of water temperature and pressure, if desired.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 1:
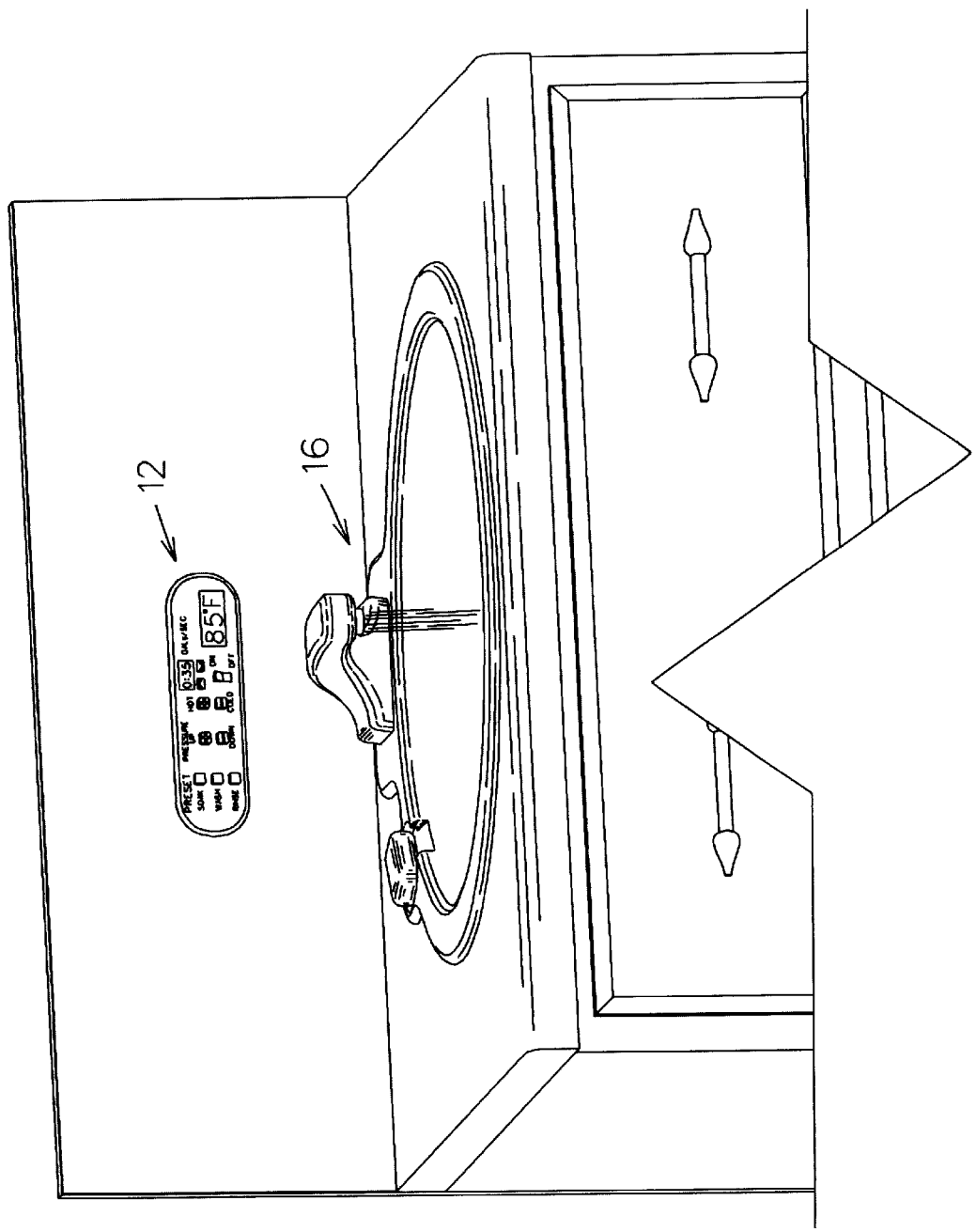
FIG. 1 is a perspective view of a water temperature and pressure regulating system according to one embodiment of the present invention in use with a sink and faucet assembly.

A water temperature and pressure regulating system according to the present invention will now be described with reference to FIGS. 1–4 of the accompanying drawings. A water temperature and pressure regulating system 10 according to one embodiment of the present invention is shown in FIG. 1 installed in a sink and faucet assembly 16. As better shown in FIG. 2, the system 10 includes a box-shaped control unit 12 that defines an interior space and includes a display module 70 as its front side. The display module 70 includes a plurality of user controls, as to be described in greater detail below. A central processing unit (CPU) 14 is positioned in the interior space of the control unit 12.

Figure 2:
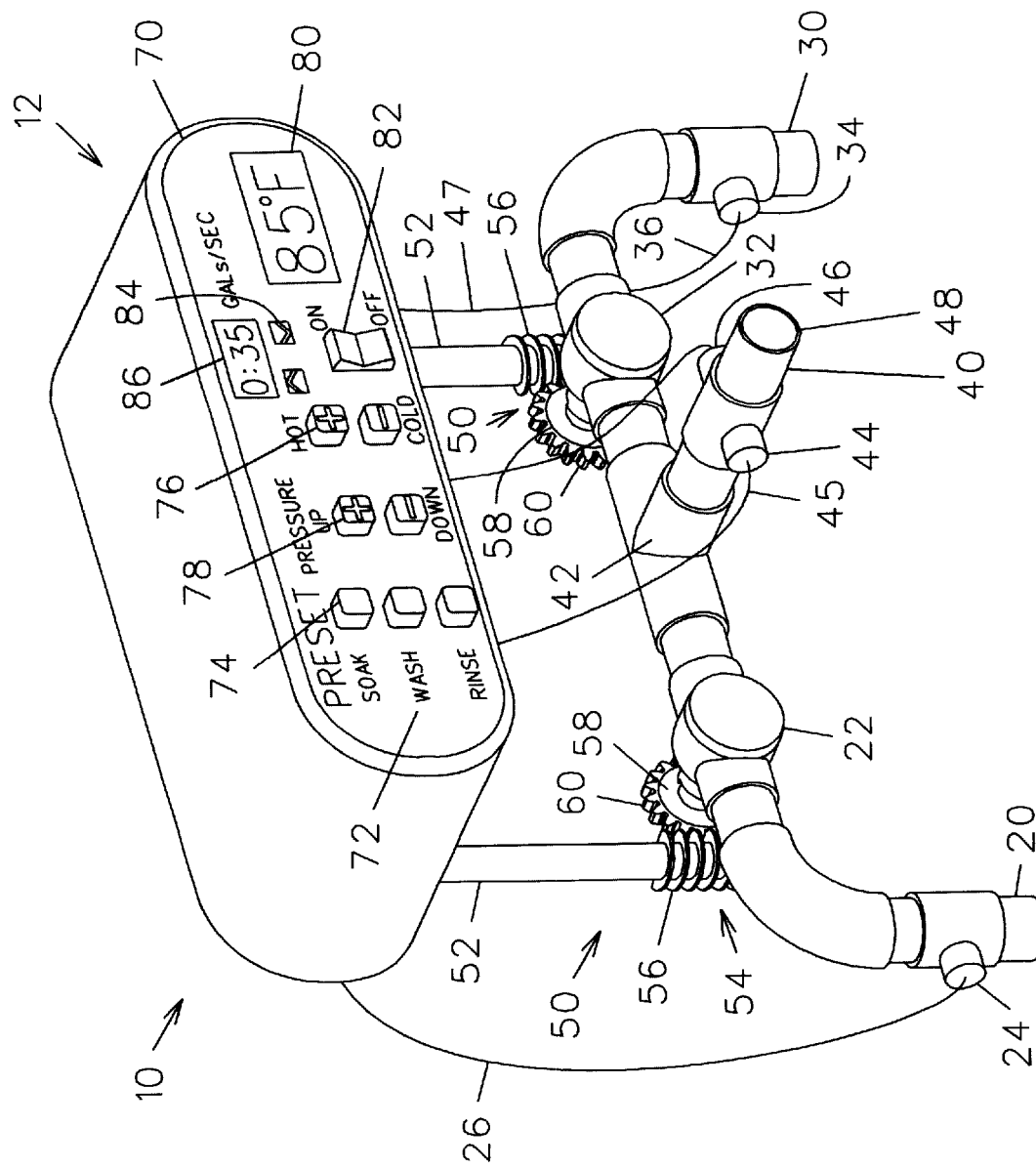
FIG. 2 is a perspective view of system as in FIG. 1 with the sink and faucet assembly removed.

The system 10 further includes first 20 and second 30 conduits connected to conventional hot and cold water sources, respectively (FIG. 2). First 20 and second 30 conduits, also referred to as inlet conduits, each include a control valve 22, 32, respectively, coupled thereto for regulating the flow of water through the respective conduit. Preferably, each control valve is a ball valve of the type that is impregnated and coated with Teflon® although other conventional valves would also be suitable. Temperature sensors 24, 34 are connected to first 20 and second 30 conduits, respectively, for detecting the temperature of water flowing through the respective conduit. Each sensor 24, 34 is positioned upstream of respective control valves 22, 32 and are electrically connected to the CPU 14 with wires 26, 36, respectively.

A third conduit 40, also referred to as the outlet conduit, is connected to the first 20 and second 30 conduits with a T-shaped coupling 42. A temperature sensor 44 and a pressure sensor 46 are connected to the third conduit 40 and adapted to detect the temperature and pressure of water flowing therethrough, respectively. The temperature 44 and pressure 46 sensors are electrically connected to the CPU 14 with wires 45, 47, respectively. The third conduit 40 defines an outlet 48 adapted for connection to a faucet, shower head, etc. (FIG. 2).

The control valves 22, 32 are incrementally opened or closed by a pair of electromechanical worm gear assemblies 50. Each worm gear assembly 50 includes a motor (not shown) positioned within the interior space of the control unit 12 and electrically connected to the CPU 14. Each worm gear assembly 50 further includes a shaft 52 having first (not shown) and second 54 ends (FIG. 2). The first end of each shaft 52 is operatively connected to a respective motor such that the shaft 52 is rotated upon an operation of the motor. It is understood that the motor may operate to rotate the shaft 52 in either a clockwise or counterclockwise direction, depending upon the signal received from the CPU 14. The shaft extends downwardly from the control unit 12 and the second end 54 includes a plurality of disc-shaped threads 56. Each worm gear assembly 50 also includes a circular worm gear 58 having a plurality of teeth 60 spaced radially about its peripheral edge. Each worm gear 58 is axially coupled to a respective control valve 22, 32 for incrementally opening or closing the respective valve upon an operation of a respective motor. When the control unit 12 is energized, each worm shaft 52 is operatively positioned such that the threads 56 thereof mate with the teeth 60 of a respective worm gear 58. Therefore, an operation of a motor as directed by the CPU operates to rotate a shaft 52 which causes its threads 56 to mate with the teeth 60 of a worm gear 58 which in turn operates to rotatably open or close a respective control valve 22, 32.

The display module 70 includes indicia 72 corresponding to the predefined temperature and pressure settings. Selector buttons 74 corresponding to this indicia and electrically connected to the CPU 14 are also provided for enabling a user to select a desired temperature and pressure setting. Temperature adjustment buttons 76 and pressure adjustment buttons 78 are also provided and electrically connected to the CPU 14 such that water temperature and pressure may be adjusted even after selecting a predefined setting. The display module 70 includes a first display screen 80 for displaying the water temperature detected by the outlet conduit temperature sensor 44. An on/off switch 82 is also provided for completely deactivating the system 10.

Figure 3:
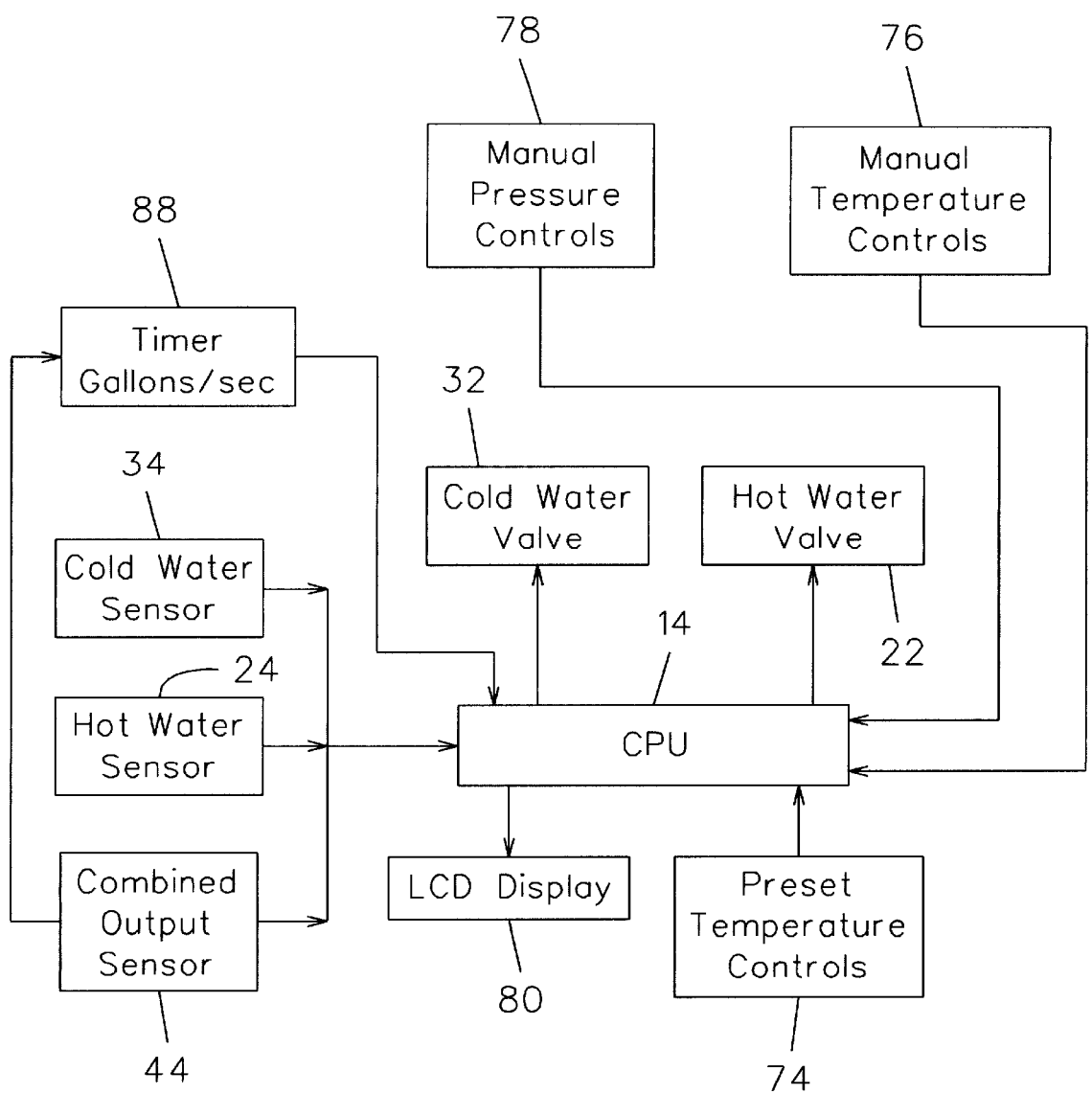
FIG. 3 is a block diagram of the system as in FIG. 2.

The system 10 may also include a timer 88 positioned in the interior space of the control unit 12 and electrically connected to the CPU 14 (FIG. 3). The display module 70 includes buttons 84 for selecting a desired amount of time for water to flow through the outlet conduit at a selected temperature and pressure. The display module includes a second display screen 86 for displaying a selected time as well as the gallons of water per second that are being used at the selected pressure. This allows a user to quickly calculate the amount of water that will be used before the timer 88 expires.

In operation, with the on/off switch 82 in the "on" position, a user may use the setting selector buttons 74 to select one of a predefined set of temperature and pressure settings. The selected setting is electrically communicated to the CPU 14 (FIG. 3). The temperature sensors 24, 34, 44 connected to the first 20, second 30, and third 40 conduits, respectively, provide temperature data to the CPU 14 several times per second. Upon selection of a preset, the CPU 14 utilizes data from first 24 and second 34 sensors in delivering signals to the motors controlling the worm gear assemblies 50 so as to open the control valves 22, 32 an effective amount to achieve the selected water temperature and pressure of water flowing from the inlet conduits 20, 30 into the outlet conduit 40. Thereafter, the CPU 14 utilizes data from the temperature sensor 44 connected to third conduit 40 to send subsequent signals to the worm gear assembly motors so as to refine the degree to which the control valves 22, 32 are in open or closed configurations (FIG. 3). The temperature within the third conduit 40 is displayed on the first display screen 80 (FIG. 2). The manual temperature adjustment buttons 76 or manual pressure adjustment buttons 78 may also be depressed by a user to signal the CPU 14 to further open or close the control valves 22, 32 and therefore to adjust either temperature or pressure, even after a predefined setting has been selected (FIG. 3). Data from the pressure sensor 46 is utilized by the CPU for properly signaling the worm gear assemblies 50 to adjust the valves.

If during operation the first conduit temperature sensor 24 indicates to the CPU 14 that the temperature of the water from the hot water source is decreasing, the CPU 14 will signal the worm gear assembly motors to partially close the control valves so as to decrease the water pressure and consequently slow the consumption of hot water while maintaining the selected temperature for as long as possible.

Figure 4:
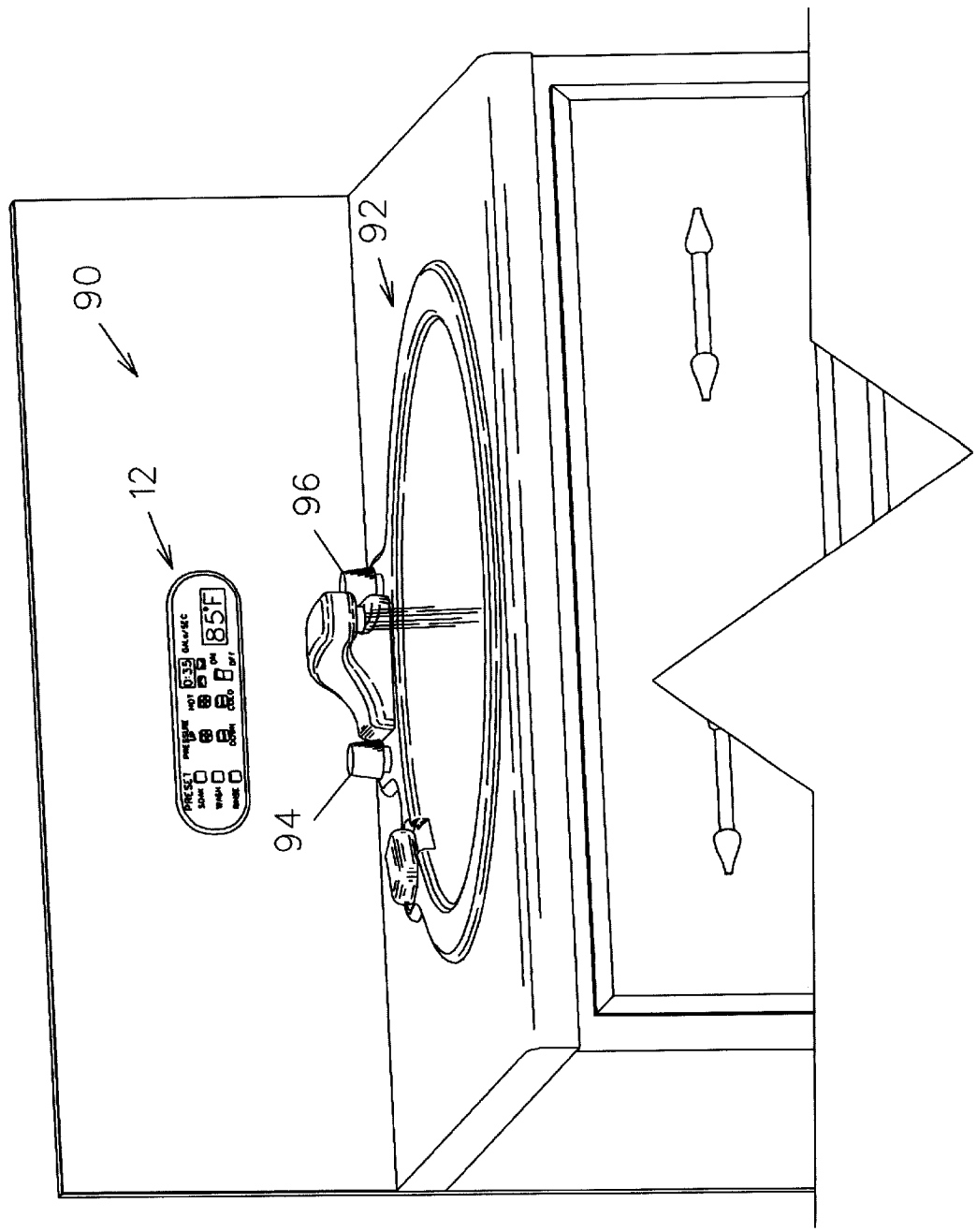
FIG. 4 is a perspective view of a water temperature and pressure regulating system according to another embodiment of the invention.

Another embodiment 90 of the invention is shown in FIG. 4 and includes a construction substantially similar to that described above except as specifically noted below. This embodiment is installed with a sink 92 having conventional hot 94 and cold 96 water knobs. When the control unit 12 is switched off, the worm gear shafts 52 disengage from respective worm gears 58. The conventional knobs 94, 96 are coupled to respective worm gears 58 so as to rotate them to actuate respective control valves upon operation of the knobs.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A water temperature and pressure regulating system, comprising:

a first conduit connected to a source of hot water, said first conduit having a first control valve;

a second conduit connected to a source of cold water, said second conduit having a second control valve;

a third conduit connected to said first and second conduits downstream from said first and second control valves and defining an outlet for delivering water from said first and second conduits to said outlet;

a first sensor connected to said third conduit for sensing the temperature of water flowing through said third conduit;

a central processing unit (CPU) electrically connected to said first sensor, said CPU adapted to store a predetermined set of water temperature settings;

means electrically connected to said CPU for selecting a water temperature from said predetermined set of water temperature settings;

electromechanical means for connecting said CPU to said first and second control valves, said CPU adapted to energize said electromechanical means to incrementally open or close respective control valves so as to establish said selected temperature of water flowing through said third conduit; and said CPU adapted to further energize said electromechanical means to incrementally close respective control valves upon said first sensor detecting a decreased temperature of water flowing through said third conduit, whereby said incremental closure of said respective control valves proportionately reduces a pressure of the water flowing through said third conduit while maintaining said selected temperature thereof.

2. The system as in claim 1 further comprising:

a second sensor connected to said first conduit upstream from said first control valve for detecting the temperature of water flowing through said first conduit, said second sensor being electrically connected to said CPU;

means in said CPU for energizing said electromechanical means upon a detection of a decrease in temperature of water flowing through said first conduit to partially close respective control valves, whereby said partial closure of respective control valves & decreases a pressure of the water flowing through said third conduit while maintaining said selected temperature thereof.

3. The system as in claim 1 further comprising:

a box-shaped control unit defining an interior space and having a display unit with a plurality of user controls mounted thereon and electrically connected to said CPU;

wherein said CPU is positioned in said interior space.

4. The system as in claim 1 wherein said electromechanical means includes a pair of worm gear assemblies, each assembly comprising:

a motor positioned in said interior space of said control unit and electrically connected to said CPU;

a shaft having a first end pivotally coupled to said motor for axial rotation of said shaft by said motor and a second end having a plurality of disc-shaped threads, said second end extending from said control unit;

a worm gear having a plurality of teeth configured to mate with said disc-shaped threads of said shaft, said worm gear being coupled to a respective control valve whereby to incrementally open or close said respective control valve upon an operation of said motor.

5. The system as in claim 1 further comprising:

a timer electrically connected to said CPU, said timer including means for selecting a desired time for water to flow through said third conduit;

means for displaying said selected time; and means in said CPU for energizing said electromechanical means to open or close respective first and second control valves so as to establish and maintain said selected water temperature and pressure relative to water flowing through said third conduit at said selected time.

6. A water temperature and pressure regulating system, comprising:

a box-shaped control unit defining an interior space and having a display module mounted to a front side thereof, said display module having a plurality of user controls positioned thereon;

a central processing unit (CPU) positioned in said interior space of said control unit and electrically connected to said display module, said CPU adapted to store a predetermined set of water temperature settings;

a first conduit connected to a source of hot water and having a first control valve coupled thereto;

a second conduit connected to a source of cold water and having a second control valve coupled thereto;

a third conduit connected to said first and second conduits and defining an outlet for fluid flow between said first and second conduits and said outlet;

a first temperature sensor connected to said third conduit for detecting the temperature of water flowing therethrough, said first temperature sensor being electrically connected to said CPU, a pair of worm gear assemblies operatively connecting said control unit to respective control valves, each worm gear assembly comprising:

a motor positioned in said interior space of said control unit and electrically connected to said CPU;

a shaft having a first end pivotally coupled to said motor for axial rotation of said shaft by said motor and a second end having a plurality of disc-shaped threads, said second end extending from said control unit;

a worm gear having a plurality of teeth configured to mate with said disc-shaped treads of said shaft, said worm gear being coupled to a respective control valve whereby to incrementally open or close said respective control valve upon an operation of a respective motor;

wherein said CPU in communication with said first temperature sensor is adapted to energize respective motors of said pair of worm gear assemblies to incrementally close respective first and second control valves so as to establish and maintain said selected water temperature, said incremental closure causing a proportionate decrease in pressure relative to water flowing through said third conduit while maintaining the temperature thereof.

7. The system as in claim 6 wherein said plurality of user controls includes means electrically connected to said CPU for manually increasing or decreasing the temperature of water flowing trough said third conduit.

8. The system as in claim 7 further comprising:

a timer electrically connected to said CPU, said timer including means on said display module for selecting a desired time for water to flow through said third conduit;

means on said display module for displaying said selected time; and wherein said CPU is adapted to energize respective motors of said pair of worm gear assemblies to open or close respective first and second control valves so as to establish and maintain said selected water temperature relative to water flowing through said third conduit for said selected time.

9. The system as in claim 7 further comprising:

a second temperature sensor connected to said first conduit upstream from said first control valve for detecting the temperature of water flowing through said first conduit, said second temperature sensor being electrically connected to said CPU;

upon detection of a decrease in temperature of water flowing through said first conduit, said CPU adapted to energize respective motors of said pair of worm gear assemblies to open or close corresponding control valves so as to decrease said selected water pressure while maintaining said selected temperature of water flowing through said third conduit.

10. The system as in claim 9 further comprising:

a third temperature sensor connected to said second conduit upstream from said second control valve for detecting the temperature of water flowing through said second conduit, said third temperature sensor being electrically connected to said CPU;

wherein said CPU is adapted to energize respective motors of said pair of worm gear assemblies to open corresponding first and second control valves to establish said selected water temperature and pressure relative to water flowing in said third conduit.

11. The system as in claim 6 further comprising a pressure sensor connected to said third conduit for sensing the pressure of water flowing through said third conduit, said pressure sensor being electrically connected to said CPU.

12. The system as in claim 11 wherein said plurality of user controls includes:

means electrically connected to said CPU for manually increasing or decreasing the pressure of water flowing through said third conduit.

13. The system as in claim 6 wherein said display module includes means for displaying the temperature of water flowing through said third conduit.

\* \* \* \* \*